May 29, 1956  N. WARMOLTZ  2,748,291
PORTABLE DOSIMETER FOR RADIO-ACTIVE RADIATION
Filed Aug. 12, 1952
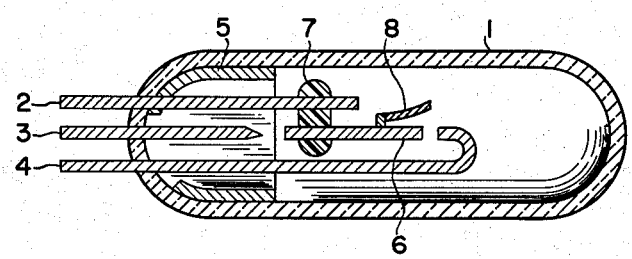
INVENTOR
NICOLAAS WARMOLTZ
BY
AGENT

2,748,291

PORTABLE DOSIMETER FOR RADIO-ACTIVE RADIATION

Nicolaas Warmoltz, Eindhoven, Netherlands, assignor to Hartford National Bank and Trust Company, Hartford, Conn., as trustee Application August 12, 1952, Serial No. 303,877

Claims priority, application Netherlands August 29, 1951

4 Claims. (Cl. 250—83.6)

This invention relates to portable dosimeters for radio-active radiation.

Such dosimeters are used to determine whether the total quantity of radio-active radiation to which a person or a device is exposed for a certain period is lower than a fixed value which is not dangerous.

For the protection of persons it is important that the dosimeter should be small in size and light in weight and should be easily transportable. It has previously been suggested therefore that such dosimeters should be shaped in the form of a fountain pen.

A known embodiment of such a dosimeter comprises an ionisation chamber of which one electrode is connected to an electrometer, the ionisation chamber and the electrometer being arranged in a common envelope. The said electrode of the ionisation chamber is charged up to a high voltage before the dosimeter is put into use. The charge on this electrode decreases as a result of ionisation occurring, so that the voltage also decreases. This voltage is determined after expiration of the period of use, it being a measure of the total quantity of radio-active radiation to which the instrument has been exposed. The voltage is read with the use of an electrometer. If desired, the scale of the electrometer may directly indicate the doses.

It is evident that the discharge of the charged electrode must be attributable solely or substantially to the ionisation occurred. This involves the necessity that the insulation of the charged electrode must satisfy very high requirements. In the above-mentioned known embodiment the charged electrode, together with all parts conductively connected thereto, is housed for this purpose wholly inside the common envelope. This affords the advantage that the low creeping resistance along the outer surface of the envelope does not play a part in the discharge in case of a moist atmosphere, it being possible for the envelope to be closed in a moist-tight manner.

The electrode connected to the electrometer is in this case required to be charged from the outside, which may be effected through a conductor specially led for this purpose through the envelope to the exterior. A conductive contact normally does not exist between this conductor and the electrode. It may be established during the charge of the electrode in different ways known per se, for example, by means of a flexible membrane or by magnetic or electrostatic forces. Furthermore, methods of charging the insulated electrode are known in which the said conductor led to the exterior may be dispensed with. In this case, use is made of either charged particles emitted by a radio-active preparation or frictional electricity.

The object of the invention is to provide a novel construction for a dosimeter which enables the insulated electrode to be loaded in a simple manner from without by electric means without the use of movable contacts.

The portable dosimeter according to the invention has the characteristic that two further electrodes are housed inside the envelope and led to the exterior.

If a potential of sufficient value is applied between the said two electrodes, a discharge phenomenon occurs inside the envelope. It has been found that, due to the discharge phenomenon, the insulated electrode acquired a potential which is in fixed relationship to the potentials of the two said electrodes. It is as if a voltage divider is connected between the two electrodes during the discharge, which voltage divider has the insulated electrode connected to it at a given point. If the voltage between the two electrodes is caused to decrease, the discharge is interrupted at a determined value of this voltage and the insulated electrode remains at a determined potential relatively to the other electrodes.

The occurrence of discharge may be facilitated by shaping one electrode in the form of a filament. By heating the latter by means of electric current during the above-mentioned charging process, thermal emission of electrons occurs by which the discharge is enhanced.

It appears that optimum results are obtained by a construction of the dosimeter in which at least part of the insulated electrode is located between the two further electrodes. It seems that the insulated electrode thus comes in good interaction with the discharge.

According to the further invention, at least one electrode preferably has a pointed shape. At high pressure of the gas-filling of the dosimeter, high ignition voltages of the discharge occurring may be decreased in this way.

In order that the invention may be readily carried into effect, it will now be described with reference to the accompanying drawing showing, by way of example, one embodiment thereof.

The envelope 1 contains three conductors 2, 3 and 4 which are led to the exterior. The ionisation chamber contains two electrodes 5 and 6. The electrode 5 is provided on the inner wall and is conductively connected to the conductor 2. It is insulated relatively to the other conductors 3 and 4. The electrode 6 is arranged in an insulated manner with the use of an insulating piece 7. A thin metal wire 8, which serves as an electrometer, is conductively connected to the insulated electrode 6. The conductors 3 and 4 serve as the two further electrodes according to the invention. If a sufficiently high voltage is applied between the conductors 3 and 4, a discharge occurs, resulting in conduction of current between the electrodes 6 and the said conductors. If this voltage is caused to decrease, the discharge is interrupted at a determined value of the voltage, so that the conduction of current between the conductors 3 and 4 and the electrode 6 ceases. The latter thus remains at a given potential. By applying a suitable voltage between the conductors 2 and 3 or 2 and 4 during the charging process described, the difference in potential which subsists between the electrodes 5 and 6 after the process is terminated between the electrodes 5 and 6 may be given any value desired.

What I claim is:

1. A portable dosimeter for measuring radio-active radiation comprising a sealed envelope, an ionizable medium in said envelope, a first pair of electrodes disposed within said envelope including a high-voltage electrode which is wholly within the envelope and free of any external conductive connections, an electrometer disposed within said envelope and connected to said high-voltage electrode, a second pair of electrodes disposed in said envelope and spaced from said high-voltage electrode, and means for applying a high voltage between said second pair of electrodes to produce a discharge therebetween and thereby charge up the high-voltage electrode.

2. A portable dosimeter for measuring radio-active radiation comprising a sealed envelope, an ionizable medium in said envelope, a first pair of electrodes disposed within said envelope including a high-voltage electrode which is wholly within the envelope and free of any external conductive connections, an electrometer disposed wthin said envelope and connected to said high-voltage electrode, a second pair of electrodes disposed in said envelope on opposite sides of and spaced from said high-voltage electrode, and means for applying a high voltage between said second pair of electrodes to produce a discharge therebetween and thereby charge up the high voltage electrode.

3. A portable dosimeter as claimed in claim 2 in which one of said second pair of electrodes is constituted by a filament.

4. A portable dosimeter as claimed in claim 2 in which one of said second pair of electrodes has a pointed shape.

References Cited in the file of this patent

UNITED STATES PATENTS

| | | |
|---|---|---|
| 1,605,911 | Banneitz | Nov. 9, 1926 |
| 1,933,063 | Kolhorster | Oct. 31, 1933 |
| 2,168,464 | Yeda | Aug. 8, 1939 |
| 2,617,044 | Neher | Nov. 4, 1952 |
| 2,659,864 | Rich et al. | Nov. 17, 1953 |